United States Patent [19]

Moser

[11] Patent Number: 4,579,396
[45] Date of Patent: Apr. 1, 1986

[54] GUIDING ASSEMBLY FOR TRANSLATORILY OR ROTATIVELY CARRYING A MOVING ELEMENT

[76] Inventor: Fernand Moser, Sur le Crêt 25, 2606 Corgémont, Switzerland

[21] Appl. No.: 590,703

[22] Filed: Mar. 19, 1984

[30] Foreign Application Priority Data

Mar. 29, 1983 [CH] Switzerland ............ 1745/83

[51] Int. Cl.⁴ ............................................. F16C 29/04
[52] U.S. Cl. .................................................... 308/6 R
[58] Field of Search ................ 308/6 R, 3 A, 3.8, 6 C

[56] References Cited

U.S. PATENT DOCUMENTS

| | | | |
|---|---|---|---|
| 2,299,677 | 10/1942 | Bickel | 308/3 A |
| 3,001,835 | 9/1961 | Kramer | 308/6 R |
| 4,194,793 | 3/1980 | Offermans | 308/6 R |

Primary Examiner—Lenard A. Footland
Attorney, Agent, or Firm—Ladas & Parry

[57] ABSTRACT

A moving element which forms a sliding carriage comprises a housing with several pairs of guiding balls supported therein, which balls are arranged for contacting and rolling on guiding surfaces of a guide means. Each guiding ball is supported by a roller bearing and is rotatable around the axis of said bearing when travelling along a guiding surface contacting the same along a little circle of its surface. The guiding balls are positioned in groups, each group of balls forming a set to provide a form-locked support transversely to the guiding direction. One ball of each set is elastically biased against the respective guiding surface. Therefore the roller bearing of said ball is mounted axially displaceable and is supported by a spring washer against an adjusting screw in said housing. Thereby a compensation of play is achieved without making necessary a precise machining of the guide.

9 Claims, 6 Drawing Figures

GUIDING ASSEMBLY FOR TRANSLATORILY OR ROTATIVELY CARRYING A MOVING ELEMENT

BACKGROUND OF THE INVENTION

1. Field of the Invention

The present invention relates to guiding assemblies for translatorily or rotatively carrying a moving element on a linear or rotational guide means, said moving elements having a housing with bearings for at least a set of guiding balls rotatively supported therein and said guide means being provided with guiding surfaces specifying a guiding direction, said guiding balls being placed relative to said guide means to contact the guiding surfaces and to provide a form-locked support transversely to said guiding direction.

2. Description of the Prior Art

A linear guiding assembly of the above mentioned type is disclosed in German patent publication No. 649 218, published Aug. 18, 1937 and in GB-publication No. 2 013 832. In these guiding assemblies the guide means have to be extremely precise to avoid jamming of the moving element on the guide means. Even though this condition is satisfied, any bending of the guide means by mechanical load leads to the danger of jamming. The only possibility to avoid this danger is to adjust the guiding balls such as to admit a certain amount of looseness or play of the guiding assembly. This, however, is not acceptable for many applications.

The same problem exists in a modified construction according to U.S. Pat. No. 3,407,011. Therein both of two rollers provided for supporting a round shaft are mounted with an amount of play and therefore do not provide a form-locked support transverse to the guiding direction. This bearing is not suited as a play-free guiding assembly since all its rollers are displaceably mounted and therefore lead to unexpected and foreseen reactions upon load.

French publication No. 739 913 discloses a carriage sliding on a bed having bearing balls, which are elastically displaceable such that upon loading the carriage the bearing balls are pressed into the bed, thereby raising the frictional forces to fix the carriage on the bed. In the invention, however, the frictional forces should not be dependent on the load applied.

In Swiss publication No. 326 285 finally a rotational guiding assembly is disclosed, wherein a round table is supported on balls which are mounted in an opposite table. This arrangement does not provide for a form-locking assembly transverse to the guiding direction and therefore can only be loaded from one side.

SUMMARY OF THE INVENTION

Hence, it is a general object of the invention to provide an improved guiding assembly for substantially play-free carrying a moving element without making necessary an extremely precise machining of the guide.

Another object of this invention aims at the provision of a linear guiding assembly which is simple in construction, especially in that the guiding balls hold each other in place, thereby avoiding expensive mounting structures for said balls.

Still another object of the invention is to provide a play-free guiding assembly composed of commercially available machine elements as simple roller bearings and without needing expensive elements.

Another object of the invention finally is to provide a guiding assembly which is easy to be adjusted for a play-free operation.

Now, in order to implement these and still further objects of the invention each set of guiding balls forming a form-locked support transversely to the guiding direction comprises one ball which is displaceably supported in the housing of the moving element and is elastically biased against one of the guiding surfaces.

According to a preferred embodiment of the invention the guiding balls are supported in the housing by means of roller bearings, the axis of which are perpendicular to the guiding direction, wherein the roller bearing belonging to the displaceable guiding ball is axially displaceable and is biased by a spring washer against said guiding surface. The bias forces can be adjusted by the appropriate choice of the spring washer and by adjusting said roller bearing in axial direction.

In order to provide a play-free guiding only one guiding ball of each set is elastically displaceable and biased against the guiding surfaces. Therefore the other balls of each set of balls are fixed in their position and define a fixed and absolutely play-free guiding assembly at loadings acting from varying direc- tions.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
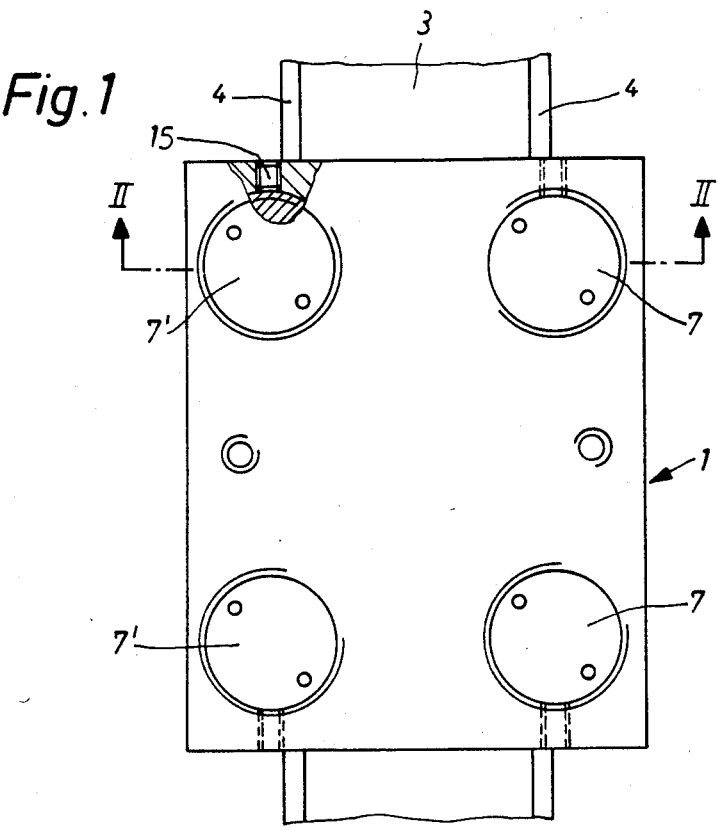
FIG. 1 is a plan view on a linear guiding assembly of the invention.
Figure 2:
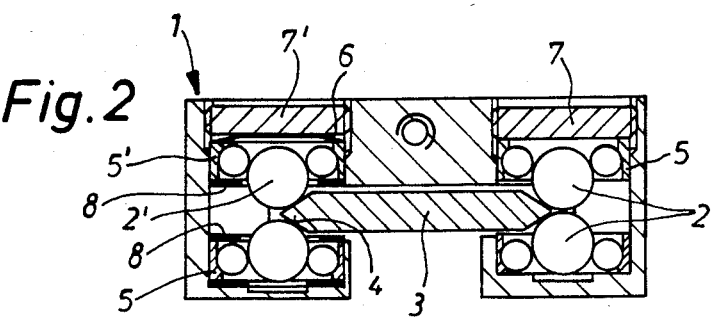
FIG. 2 is a sectional view of the assembly of FIG. 1 along the line II—II in this figure.

The linear guiding assembly shown in the FIGS. 1 and 2 comprises a moving element 1 which is formed as a carriage 1 sliding on guiding ball 2, 2' supported therein on a linear guide means 3. The guide means is a flat guideway 3 having edges 4, which outwardly converge and thereby form a V-shaped profile. The V-shaped edges provide four guiding surfaces, on which the guiding balls roll. Each guiding ball 2, 2' is supported directly on the balls of a ball bearing 5, the axis of which is perpendicular to the guiding direction and which is suited to take loads directed perpendicular to the guiding surface, i.e. inclined to its axis.

The four guiding balls 2 shown in FIG. 2 together form a set of balls, which support the rail 3 formlocked transverse to the guiding direction such that there is only one degree of freedom of relative movement of the carriage along the rail. The guiding assembly of FIGS. 1 and 2 totally has two set of balls, as can be seen from FIG. 1. In each set one ball 2' is supported elastically displaceable, such that it is biased against its guiding surface 4, whereas the other balls 2 have a fixed position in the carriage 1. Said elastically displaceable support is formed by the corresponding ball bearing 5' which is axially displaceable in the carriage against the force of a spring 6. The spring preferably is a spring washer, since only very small displacements are necessary and desired. The spring washer lies with its bigger radius against the outer race of the ball bearing 5'. Its inner race contacts an adjusting screw 7' in the carriage, by which screw the bias load of the ball 2' can be adjusted. As can be seen for geometrical reasons the guiding balls 2, 2' rotate exclusively along the axis of the corresponding ball bearing and the trajectory of the points of contact between the guiding balls 2, 2' and the guiding surfaces 4 forms a little circle on the balls. Therefore, opposite guiding balls 2 can be brought into contact with each other in their rotational axis. This is the case in all ball pairs 2 of the embodiment of FIGS. 1 and 2, which do not comprise an elastically displaceable ball 2', i.e. the pair on the right in FIG. 2. Thereby the adjusting procedure can substantially be facilitated without any functional drawback. If said pairs of guiding balls 2 are brought into contact, then on one side a defined seat for the guiding surfaces 4 on the corresponding balls is given, such that the adjustment procedure is reduced to the adjustment of the elastically displaceable guiding ball 2' in each set of balls. As further advantage of this assembly any danger of the cage of the ball bearings 5 leaving its seat by tripping over is excluded. The same danger is prevented by the pairs of balls 2, 2' comprising an elastically displaceable ball 2' by mounting annular holders 8 at the outside of the respective ball bearings 5, 5' (see left hand side in FIG. 2). In any case the guiding balls are dimensioned such that the opposite guiding balls of each pair hold each other in place and thereby prevent each other from dropping out.

Figure 3:
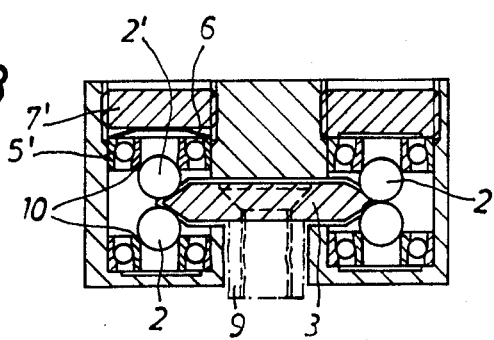
FIG. 3 is a sectional view as in FIG. 2 of a second, modified embodiment of the linear guide assembly of the invention.

The mentioned rotation of the guiding balls 2, 2' in the axis of the ball bearings 5, 5' allows in a modified embodiment of the invention, as shown in FIG. 3, to use ball bearings 5, 5' having an outer and an inner race 10, the guiding balls 2, 2' being supported in the corresponding inner races 10 of the ball bearings. The inner race 10 is slightly conical at its inner circumference to provide a seat for the ball. This embodiment has the advantage that no additional means are needed to secure the cages of the ball bearings from leaving their places.

For the described linear guiding assemblies, having one elastically biased guiding ball in each set of balls, a guideway 3 can be used, which, though having parallel guiding surfaces, need not be very precise. Possible deviations from the exact measures caused by imprecise machining or by mechanical bending are compensated by the displaceable guiding ball 2' of each set of guiding balls. The direction, in which the load is applied to the guiding assembly, i.e. the way of arranging the assembly in a given situation, is chosen such that said displaceable guiding ball 2' is not exposed to the major forces, which in contrast are taken by the fixed guiding balls 2, thereby providing a practically play-free guiding. The adjusting screw 7' furthermore allows to adapt the bias force to the existing load. The other adjusting screws 7, which can be secured by locking screws 15 serve for adjusting the relative position of the guiding balls 2 to the guideway 3, such that they contact the guiding surfaces symmetrically.

As can be seen from FIG. 3, the carriage is opened on one side of the guideway 3, which enables a securing of the same at desired places over its whole length. It is possible to enforce the structure of the guideway 3 by additional elements 9 mounted on said side.

Figure 4:
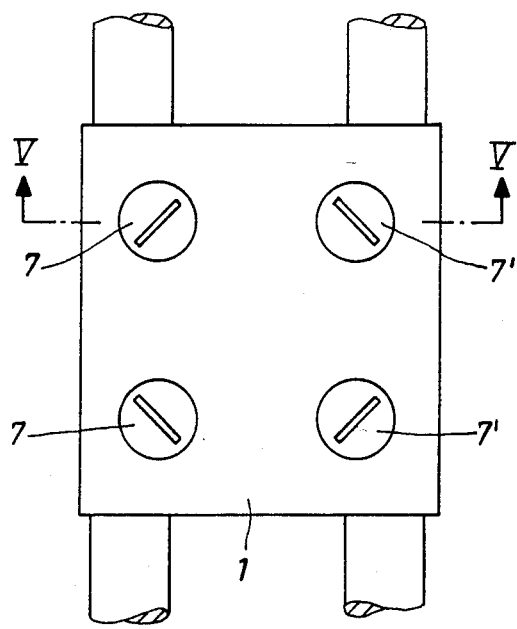
FIG. 4 is another embodiment of a linear guide of the invention in plan view, using two bars as guiding means.
Figure 5:
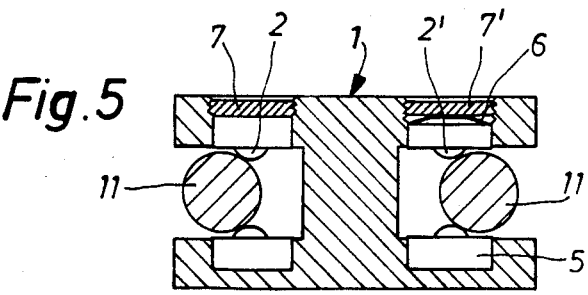
FIG. 5 is a sectional view of the assembly of FIG. 4.

In FIGS. 4 and 5 a third embodiment of the invention is shown, wherein the guide means are formed by two parallel bars 11, along which the guiding balls 2, 2' roll. This embodiment substantially corresponds to the afore described ones, wherein the guiding surfaces are now formed by the surface of circular bars 11. Said bars 11 are mounted at their end and/or laterally at their outer side. Slight deviations from parallelism are compensated again by the displaceable guiding ball 2' of each set of balls. Since in this embodiment the distance of opposite guiding balls 2, 2' is large, they do not hold each other in place. Therefore, the balls are inserted when mounting the carriage on the bars 11. In this embodiment it is also sufficient to have only one ball of each pair of guiding balls adjustable. To this end adjusting screws 7 are provided, which can be operated from the outside of the carriage as in the other embodiments.

Figure 6:
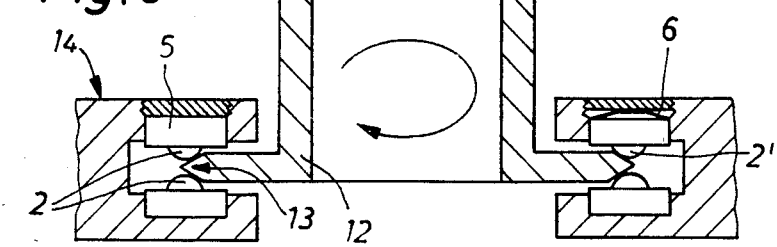
FIG. 6 is a sectional view of a rotational guiding assembly of the invention.

In FIG. 6 a rotational guiding assembly is shown which is also based on the described principles. The guide means is a circular plate 12, the periphery of which is provided with an outwardly converging V-shaped profile, forming guiding surfaces 13. A support 14 is placed along the circumference of the circular plate 12 and carries guiding balls 2, 2' which are arranged in pairs. Three pairs of guiding balls 2, 2' form a set of balls which provide a form-locked guiding. One guiding ball 2' of this set of balls is elastically biased against the corresponding guiding surface 13, as is schematically shown in FIG. 3. The remaining features are the same as in the afore described embodiments.

The linear and rotational guiding assemblies of this invention can be used on various technical fields, especially in the field of microtechnique up to machines of medium size, wherein a relative high precision at medium loads is desired. They can be used e.g. as guiding assemblies for industrial robots. The precision of machining of the guiding surface can be adapted to the specific use. The proper operation of the guiding assemblies does not depend on such precision, especially as to the freedom of play, which is prevented even with relatively imprecise guideways.

While there are shown and described present preferred embodiments of the invention, it is to be distinctly understood that the invention is not limited thereto, but may be otherwise variously embodied and practiced within the scope of the following claims.

I claim:

1. Guiding assembly comprising a moving element having a housing with bearings for at least a set of guiding balls rotatively supported therein and guide means being provided with guiding surfaces specifying a guiding direction, said guiding balls being placed relative to said guide means to contact the guiding surfaces and to provide a form-locked support transversely to said guiding direction, wherein one of each set of guiding balls is displaceably supported in said housing transversely to the guiding direction and is elastically biased against one of said guiding surfaces, wherein said bearings in said housing are ball bearings having their axis perpendicular to the guiding direction, said set of guiding balls comprises pairs of balls, each pair being constituted by two opposite balls having a distance from each other such as to hold each other in place.

2. Guiding assembly of claim 1, wherein said bearings in said housing are ball bearings having their axis perpendicular to the guiding direction, and wherein one of said ball bearings of one of the displaceably supported guiding balls is mounted within said housing to be axially displaceable and biased by means of a pressure spring located between said ball bearings and said housing.

3. Guiding assembly of claim 2, wherein said displaceable ball bearing has at least an outer race, and wherein said pressure spring is a spring washer, which with its bigger radius contacts said outer race of said displaceable ball bearing.

4. Linear guiding assembly of claim 2, wherein the guide means comprise a rail and the moving element is formed as a sliding carriage, said rail having a flat profile, the edges of which forming guiding surfaces which converge outwardly, said sliding carriage comprising two sets of guiding balls, which provide form-locked support transversely to the guiding direction each set of said guiding balls being fomred by two pairs of balls, wherein the balls of each set are placed in a plane perpendicular to the elongation of the rail, and wherein a respective one of the balls of each set is elastically biased against a guiding surface.

5. Linear guiding assembly of claim 4, wherein the balls of one pair of each set of said guiding balls contact each other at their center of rotation, and wherein the other pair of balls of each set comprises said elastically biased ball.

6. Guiding assembly of claim 1, wherein one ball of each pair of guiding balls is adjustable in its position perpendicular to the guiding direction by axial displacement of the respective ball bearings, whereas the position of the opposite ball is fixed.

7. Linear guiding assembly of claim 6, wherein the balls of the set of guiding balls on one side of the flat rail are adjustable in their position transverse to the rail by axially displacing the respective ball bearings.

8. Guiding assembly of claim 1, wherein each set of guiding balls comprises at least two pairs of balls.

9. Guiding assembly of claim 1, wherein said ball bearings each have an inner and an outer race, each inner race constituting the seat for a guiding ball.

* * * * *